Figure 1:
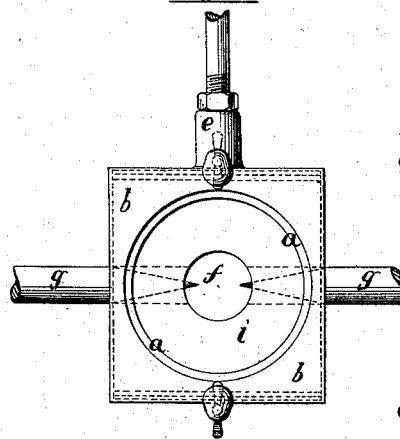

(No Model.)

C. F. DE LA ROCHE.
ELECTRIC ARC LIGHT.

No. 262,015. Patented Aug. 1, 1882.

Witnesses
George H Botts
Theo Hayner

Inventor
Charles F. de La Roche
By his Attorneys
Brown & Brown

UNITED STATES PATENT OFFICE.

CHARLES F. DE LA ROCHE, OF PARIS, FRANCE.

ELECTRIC-ARC LIGHT.

SPECIFICATION forming part of Letters Patent No. 262,015, dated August 1, 1882.

Application filed January 7, 1882. (No model.) Patented in Belgium December 12, 1881, No. 56,465, and February 6, 1882, No. 56,982; in France December 24, 1881, No. 146,541, and in Italy December 31, 1881.

*To all whom it may concern:*

Be it known that I, CHARLES FERDINAND DE LA ROCHE, of Paris, in the Republic of France, have invented a new and useful Improvement in Electric Arc Lights, of which the following is a description, reference being had to the accompanying drawings.

This invention consists in producing the voltaic arc within a chamber formed in a block of any suitable refractory material, wherein the carbons or electrodes may move freely toward each other without any resistance from the block, said block having in its opposite faces openings enlarged in hollow conical or flaring form, permitting the light produced to emerge in opposite directions. By this chamber I secure absolute fixity of the voltaic arc by protecting the electrodes from air-currents, and obviate any tremor of the light. This chamber may be provided in the interior of a block of any refractory substance whatever, such as magnesia, zirconia, or platinum; but the material which I preferably employ is chemically-pure calcined magnesia pressed into molds by powerful hydraulic or other pressure. Blocks of this material, which may be of parallelopipedal form externally, and about three or four centimeters square and two centimeters thick, may be held in an envelope of metal—such as platinum, copper, or steel—which is hollowed out according to the direction in which the light is desired to be projected, and which permits the use of the block for many days, even when it has been chipped or cracked by use. The wasting away or using up of such blocks is very slow, as their walls are not encountered directly by the voltaic arc, and their temperature, even though it may be sometimes very high, will never be sufficient to attack pure magnesia. On the contrary, when the electrodes are made to rest against refractory abutments the latter are attacked rapidly by the potash and silica contained in the carbons and by the natural perforative force of the arc; and, moreover, the points of the electrodes are covered with a light coating of silica, which displaces the arc or extinguishes the lamp. Under the action of the heat disengaged from the voltaic arc the internal walls of the chamber arrive at white heat and become so incandescent that the luminous rays thus produced unite with those of the arc of which they increase the intensity, giving birth to a luminous sheet of an intense white, tending slightly to golden yellow, instead of the ordinary peculiarly pale, wan color of the voltaic arc. Under these conditions the variations of light proceeding from the changes in the current, owing to variations in speed of dynamo-electric machines, are not appreciable to the eye. There may be placed over the openings of the block or chamber thin sheets of mica or other translucent refractory material, which will prevent the surrounding air from reaching the electrodes. In such case the temperature of the air contained in the chamber is still more elevated, which still further increases the dimensions of the voltaic arc to a considerable extent. In all cases the block or chamber is suspended in the interior of the lamp by means of one or more adjustable rods, which permit it to be arranged directly in the axis of the electrodes, and thus to avoid all friction, which might impede the advancement of the carbons.

In order to facilitate the understanding of my invention, I have represented several examples of it in the accompanying drawings.

Figure 2:
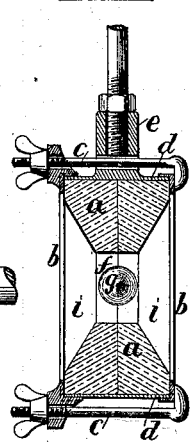
Figure 3:
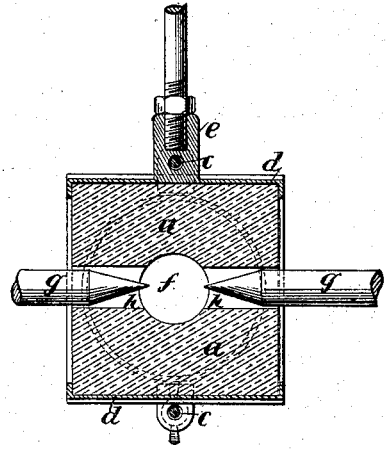
Figure 4:
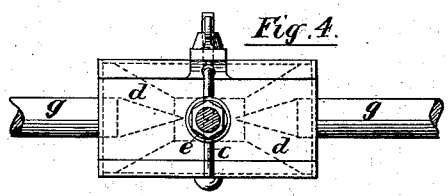
Figure 5:
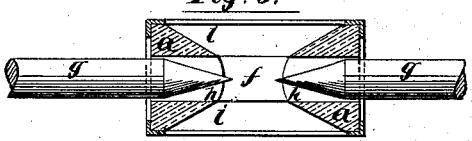

Figures 1, 2, 3, 4, and 5 represent an example of my system of refractory block in which the chamber which receives the ends of the electrodes has conically enlarged or flaring openings to permit the passage of the luminous rays in two opposite directions. Fig. 1 is a face view. Fig. 2 is a central vertical transverse section. Fig. 3 is a central vertical section parallel with Fig. 1. Fig. 4 is a top view. Fig. 5 is a central horizontal section.

The refractory block $a$ is made of two pieces, held together by two flanged clamping-plates, $b$, and clamping-screws $c$, which also hold the metallic plates $d$, which serve to prevent fragments of the block from becoming detached in case of its cracking in use. The upper plate, $d$, is furnished with a screw-socket, $e$, which serves to secure the block and adjust its position in the interior of the lamp.

$f$ is the chamber formed in the center of the block $a$ to receive the points of the electrodes $g\,g$, which enter through openings $h\,h$ in two opposite sides of the chamber.

$i\ i$ are the conically enlarged or flaring openings in two opposite sides of the chamber $f$ for the passage of the luminous rays.

The electrodes $g$ slide freely in the block $a$, and meet with no resistance from the block as they move toward each other.

Figure 6:
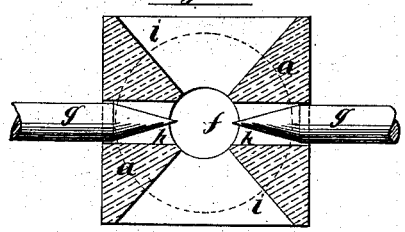
Figure 7:
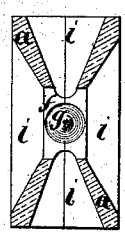

Figs. 6 and 7 are sections at right angles to each other of another example of my invention, in which the block $a$ has four conically-enlarged openings, $i\ i$, from the chamber $f$ to permit the passage of the luminous rays.

Figure 8:
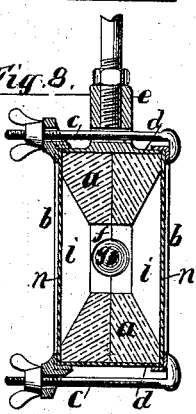

Fig. 8 is a vertical central section, showing the application of plates $n\ n$, of mica or translucent material, over the openings $i\ i$ of the block or chamber for the purpose of preventing the surrounding air from reaching the electrodes. These plates $n\ n$ are represented as secured by having their edges clamped to the block $a$ by the overlapping edges of the clamping-plates $b\ b$; but the said plates $n\ n$ may be secured in any other convenient manner.

It may be understood that my invention, being applicable to all kinds of electric lamps in use, may be employed with any system of applying the carbons, which may be placed in horizontal, vertical, or oblique directions, and my invention may be employed with lenses and reflectors of all forms and dimensions, according to the nature of the application which is made of it.

What I claim as my invention, and desire to secure by Letters Patent, is—

1. The combination, with the carbons or electrodes in an electric lamp, of a chamber composed of refractory material, in which the carbons or electrodes may move freely and without resistance from the chamber toward each other, and within which the voltaic arc is produced, said chamber being provided with openings in opposite sides, through which light is emitted, substantially as herein described.

2. The combination, with the refractory chamber $f$, of the plates $n\ n$, substantially as and for the purpose herein described.

CHARLES F. DE LA ROCHE.

Witnesses:
 EUG. DUBUIL,
 EMIL BERT.